United States Patent
Ives et al.

(10) Patent No.: US 7,519,112 B2
(45) Date of Patent: Apr. 14, 2009

(54) TESTING DEVICE AND METHOD FOR PROVIDING RECEIVER OVERLOAD PROTECTION DURING TRANSCEIVER TESTING

(75) Inventors: Fred Herbert Ives, Veradale, WA (US); George Stennis Moore, Veradale, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 619 days.

(21) Appl. No.: 11/263,236

(22) Filed: Oct. 31, 2005

(65) Prior Publication Data

US 2007/0098059 A1    May 3, 2007

(51) Int. Cl.
*H04B 3/46*    (2006.01)
(52) U.S. Cl. ...................................................... 375/224

(58) Field of Classification Search ................. 375/224, 375/225, 226, 227, 228; 324/513, 523, 527, 324/528, 750, 755, 763, 765; 370/247, 251; 379/21, 26.02, 27.04; 700/39, 81; 702/120, 702/121; 714/30, 36, 715, 734, 738; 455/127.1
See application file for complete search history.

(56) References Cited

U.S. PATENT DOCUMENTS

2007/0184790 A1*    8/2007    Gilberton et al. ......... 455/127.1

* cited by examiner

*Primary Examiner*—Sam K Ahn

(57) ABSTRACT

A testing device for testing transceivers includes a transmitter operable in a first state to transmit signals, a receiver operable in a second state to receive signals and a power coupler coupling the transmitter to the receiver. The testing device further includes an overload protection device operably coupled between the power coupler and the receiver to reduce or maintain the signal strength of a received signal at the receiver based on a control signal. A controller determines a current state of the received signal and generates the control signal based on the current state of the received signal.

9 Claims, 2 Drawing Sheets

TESTING DEVICE AND METHOD FOR PROVIDING RECEIVER OVERLOAD PROTECTION DURING TRANSCEIVER TESTING

BACKGROUND OF THE INVENTION

Wireless communication devices, such as cellular telephones, two-way radios, personal digital assistants (PDA), pagers, personal computers (PC), laptop computers, home entertainment equipment, etc., typically include a built-in radio transceiver (i.e., transmitter and receiver) for communicating directly or indirectly with other wireless communication devices. Each transceiver is configured to operate in one or more frequency bands using one or more communication standards. Examples of communication standards include, but are not limited to, IEEE 802.11, Bluetooth, advanced mobile phone services (AMPS), digital AMPS, global system for mobile communications (GSM), code division multiple access (CDMA), wideband CDMA, Time Division Duplex (TDD), and/or variations thereof.

Manufacturers of wireless communication devices usually test the device transceivers for proper operation in each applicable frequency band and for each applicable communication standard before shipping the wireless communication devices to end users. For example, common transceiver tests include error-vector magnitude (EVM) for transmitter modulation accuracy, bit error ratio (BER) or signal to noise and distortion (SINAD) for the receiver sensitivity in the presence of signals and noise, and spectral mask for the transmitter adding unwanted signals. Wireless communication devices are typically tested by a transceiver testing device that includes a test transceiver for communicating with the wireless communication device to make the various measurements of the wireless communication device.

In order to effectively test transceivers in different frequency bands and/or for different communication standards, the test transceiver should be designed for general testing of all potential frequency bands and communication standards. Thus, the test transceiver should be able to accommodate testing in different transmit and receive frequency bands and testing in the same frequency band for both transmit and receive. Modem communication standards can utilize time division multiple access (TDMA), frequency division multiple access (FDMA), time division duplex (TDD), code division multiple access (CDMA), or combinations of these standards. As a result, many new systems have large transient signals. In systems employing large transient signals (e.g., WCDMA signals and TD-SCDMA signals), transmitters will operate a power levels that are significantly higher than receivers. Therefore, when testing transceiver devices that use the same frequency band for transmit and receive, such as a system utilizing time division duplex (TDD) on the same frequency, there must be sufficient isolation between the test transmitter and test receiver to avoid overloading the test receiver.

One solution to avoiding receiver overload is to use a high isolation switch module at the front end of the test transceiver to switch the antenna between the transmitter and the receiver. However, these switch solutions rely on precise timing, which may not be possible when testing transceiver devices designed for use in asymmetric transmit/receive systems where the bandwidth timeslots are not shared equally between transmit and receive modes. In addition, it is difficult to obtain high isolation at RF frequencies. Another solution to avoiding receiver overload is to use multiple receivers programmed to receive different power levels. However, the extra hardware required for each additional receiver undesirably increases the cost and complexity of the transceiver testing device. Therefore, what is needed is a transceiver testing device that provides sufficient receiver overload protection when testing both symmetric and asymmetric systems without requiring additional receivers.

SUMMARY OF THE INVENTION

Embodiments of the present invention provide a transceiver testing device that provides receiver overload protection. The testing device includes a transmitter operable in a first state to transmit signals, a receiver operable in a second state to receive signals and a power coupler coupling the transmitter to the receiver. The testing device further includes an overload protection device operably coupled between the power coupler and the receiver to reduce the signal strength of a received signal at the receiver based on a control signal. A controller determines a current state of the received signal and generates the control signal based on the current state of the received signal.

In one embodiment, the controller generates the control signal to reduce the signal strength of the received signal when the current state of the received signal is the first state corresponding to a transmit mode. In this embodiment, the controller also generates the control signal to restore the signal strength of the received signal when the current state of the received signal is the second state corresponding to a receive mode.

For example, in an exemplary embodiment, the controller includes a comparator for comparing a signal level of the received signal to a threshold. The controller generates the control signal to reduce the signal strength of the received signal when the signal level is greater than the threshold. The controller generates the control signal to restore the signal strength of the received signal when the signal level is less than the threshold. In another exemplary embodiment, the controller includes a counter operable to count pulses of a clock signal to produce a pulse count and a comparator operable to compare the pulse count to timing information indicating timeslot beginnings. The controller generates the control signal when the pulse count equals the timing information.

In one aspect of the invention, the overload protection device includes an attenuator operable to attenuate the signal strength of the received signal. In another aspect of the invention, the overload protection device includes a high isolation switch operable in a first mode to provide the received signal to the receiver and in a second mode to block the received signal to prevent the received signal from entering the receiver.

Embodiments of the present invention further provide a method for providing receiver overload protection during transceiver testing. The method includes providing a first state for transmitting signals and a second state for receiving signals. The method further includes determining a current state of a received signal. If the current state is the first state, the method includes reducing the signal strength of the received signal.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

Figure 1:
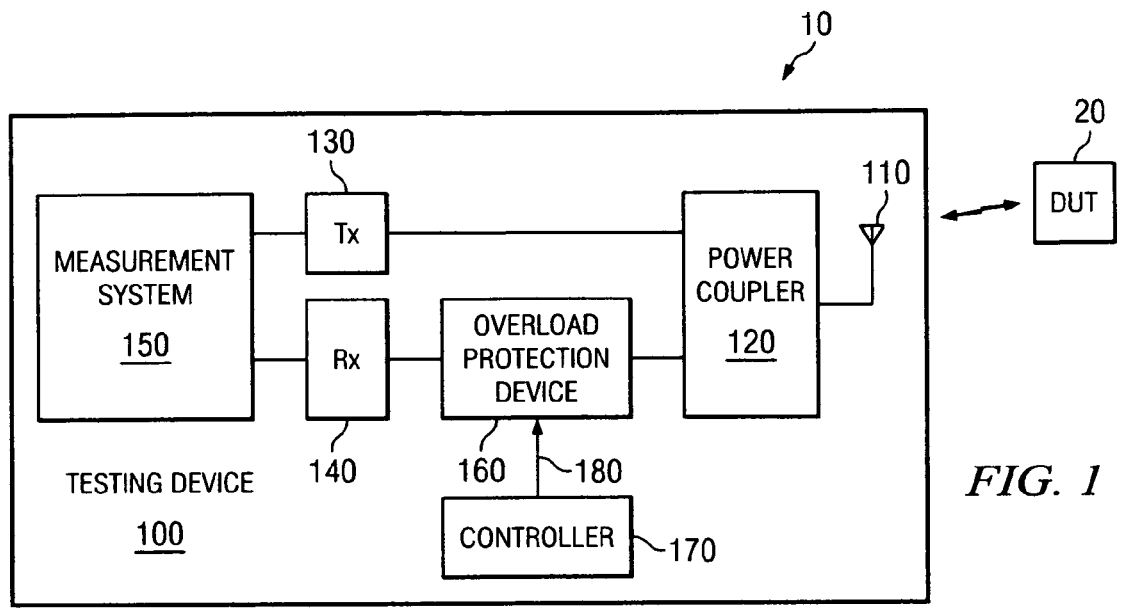
FIG. 1 is a block diagram illustrating an exemplary test system for testing a transceiver device under test (DUT), in accordance with embodiments of the present invention.

FIG. 1 is a block diagram illustrating an exemplary test system 10 including a testing device 100 for testing one or more transceiver devices under test (DUT) 20, in accordance with embodiments of the present invention. The testing device 100 includes an antenna 110, power coupler 120, transmitter 130, receiver 140 and measurement system 150. The transmitter 130 and receiver are both coupled to the antenna 110 via the power coupler 120, which enables the testing device 100 to test both symmetric transceivers and asymmetric transceivers operating in the same or different transmit and receive frequency bands. The connection from the DUT 20 to the power coupler 120 can be through antenna 110, as shown, or alternately with a direct coaxial cable connection from DUT 20 to power coupler 120. In addition, the transmitter 130 is coupled to the measurement system 150 to generate radio frequency (RF) signals for transmission to the DUT 20, and the receiver 140 is coupled to the measurement system 150 to provide RF signals received from the DUT 20 to the measurement system 150.

The transmitter 130 typically includes a data modulation stage, one or more intermediate frequency stages, and a power amplifier stage. The data modulation stage converts raw data into baseband signals in accordance with a particular wireless communication standard. The intermediate frequency stages mix the baseband signals with one or more local oscillators to produce RF signals. The power amplifier stage amplifies the RF signals to the appropriate transmit power prior to transmission via the antenna 110 and power coupler 120.

The receiver 140 typically includes a low noise amplifier, one or more intermediate frequency stages, a filtering stage, and a data recovery stage. The low noise amplifier receives an inbound RF signal at a received power via the antenna 110 and power coupler 120 and amplifies it. The intermediate frequency stages mix the amplified RF signal with one or more local oscillators to convert the amplified RF signal into a baseband signal. The filtering stage filters the baseband signals to attenuate unwanted out of band signals to produce a filtered signal. The data recovery stage demodulates the filtered signal to recover the raw data in accordance with the particular wireless communication standard.

In an exemplary test operation for testing the sensitivity of a receiver in the transceiver DUT 20, the measurement system 150 provides a test symbol sequence to the testing device transmitter 130. The testing device transmitter 130 generates a modulated test signal from the test symbol sequence and transmits the modulated test signal at a low level to the DUT 20 via the antenna 110 and power coupler 120. The DUT 20 demodulates the modulated test signal to recapture inbound data in accordance with the particular wireless communication standard being implemented, and provides an output demodulated signal, including the recaptured inbound data (i.e., a DUT 20 receiver version of the test symbol sequence), to the DUT 20 transmitter section, allowing it to be sent back to the antenna 110 of the testing device 100. This signal is routed back to the measurement system 150, where the sensitivity of the DUT 20 is compared to the test symbol sequence. The result is the DUT 20 receiver demodulation performance measurement, usually expressed as bit error ratio (BER).

In an exemplary test operation for testing the modulation error of a transmitter of the transceiver DUT 20, the measurement system 150 captures a test symbol sequence from the transmitter in the DUT 20 via the standard interface. The measurement system 150 measures the modulation error of the transmitter of the DUT 20 by comparing the recovered test symbol sequence in the output demodulated signal to the original test symbol sequence input to the transmitter of the DUT 20 to determine the measured error. The transmitter modulation error of the DUT 20 is typically expressed as error vector magnitude (EVM).

Typically, the transmitter 130 of the testing device 100 generates and transmits a test signal to the DUT 20 in a transmit timeslot, while the receiver 140 of the testing device 100 receives a signal from the DUT 20 in a receive timeslot. However, when testing large transient signals with both the transmitter 130 and receiver 140 tuned to the same frequency, signal coupling between the transmitter 130 and the receiver 140 may overload the receiver 140 during transmit timeslots. After overload, the receiver 140 may require an amount of time from 100 ns to 10 ms to recover, which may prevent the receiver 140 from making effective measurements during receive timeslots.

Therefore, in accordance with embodiments of the present invention, the testing device 100 further includes an overload protection device 160 and an overload controller 170 for protecting the receiver 140 from overload conditions. The overload protection device 160 is coupled between the power coupler 120 and the receiver 140, and operates either to reduce the signal strength (i.e., power) of a received signal present at the input of the overload protection device 160 or to restore the signal strength of the received signal present at the input of the overload protection device 160 before providing the signal to the receiver 140. As used herein, the phrase "restore the signal strength" refers to the signal strength of the received signal at the output of the overload protection device 160 during a substantial portion of a receive timeslot.

A signal received at the input of the overload protection device 160 is either a signal received by the antenna 110 from the DUT 20 and coupled to the overload protection device 160 via the power coupler 120 or a signal transmitted by the transmitter 130 and coupled to the overload protection device 160 via leakage through the power coupler 120. In most modern communication environments, signals received by the antenna 110 are at significantly lower power levels than signals transmitted by the transmitter 130. Thus, to prevent overload of the receiver 140 in these communication environments, the overload protection device 160 reduces the power level of those signals that are transmitted by the transmitter 130 and coupled to the receiver 140 by the power coupler 120.

The overload protection device 160 is controlled by a control signal 180 generated by the overload controller 170. The overload controller 170 determines the current state of a received signal present at the input of the overload protection device 160, and generates the control signal 180 based on the current state. The current state corresponds to either a transmit power level associated with a coupled signal transmitted from the transmitter 130 in a transmit timeslot or a receive power level associated with an input signal received by the antenna 110 in a receive timeslot.

In one embodiment, the overload controller 170 determines the current state of the received signal from the received signal itself. For example, the overload controller 170 can measure the power level of the received signal, and determine the current state based on the measured power level. If the measured power level is high, e.g., the transmit power level, the overload controller 170 generates the control signal 180 in a first state (e.g., logic "1") to cause the overload protection device 160 to reduce the signal strength of any signal present at the input of the overload protection device 160. If the measured power level is low, e.g., the receive power level, the overload controller 170 generates the control signal 180 in a second state (e.g., logic "0") to cause the overload protection device 160 to restore the signal strength of any signal present at the input of the overload protection device 160.

In another embodiment, the overload controller 170 determines the current state of the received signal synchronous with transmit and receive timeslots. In transmit timeslots, the overload controller 170 generates the control signal 180 in the first state (e.g., logic "1") to cause the overload protection device 160 to reduce the signal strength of any signal present at the input of the overload protection device 160. In receive timeslots, the overload controller 170 generates the control signal 180 in the second state (e.g., logic "0") to cause the overload protection device 160 to restore the signal strength of any signal present at the input of the overload protection device 160.

The overload protection device 160 includes any device capable of modifying the signal strength of a signal. For example, in one embodiment, the overload protection device 160 is a programmable attenuator having at least two different attenuation settings. One of the attenuation settings causes the attenuator to attenuate the signal strength of the received signal by a first attenuation amount, while another attenuation setting causes the attenuator to attenuate the signal strength of the received signal by a second attenuation amount greater than the first attenuation amount. In general, the first attenuation setting attenuates less than fifty percent of the signal and the second attenuation setting attenuates greater than fifty percent of the signal. For example, in an exemplary embodiment, the first attenuation setting attenuates ten percent or less of the signal and passes ninety percent or greater of the signal to the receiver 140, while the second attenuation setting attenuates ninety percent or greater of the signal and passes ten percent or less of the signal to the receiver 140.

An example of an attenuator is Agilent Technologies AT040G GaAs attenuator with a clear ceramic lid. The attenuator can be quickly set to 40 dB at the beginning of the transmit timeslot and quickly reset to a nominal value, e.g., between 0 and 15 dB, in any of 1 dB steps, at the beginning of the receive timeslot. The settling time and overload recovery of the AT040G attenuator can be increased by shining a red LED light over the lid onto the GaAs attenuator die in the AT040G attenuator package.

In another embodiment, the overload protection device 160 is a programmable blanking switch operable in a first mode to pass the received signal to the receiver 140 and in a second mode to block the received signal to prevent the received signal from entering the receiver 140. Thus, in the first mode, the switch is closed to switch the received signal onto the receiver signal path, and in the second mode, the switch is open to switch the received signal away from the receiver signal path. An example of a switch is the Agilent Technologies TC751 single pole double throw GaAs switch with internal LED lighting to switch the signal away from the signal path.

Figure 2:
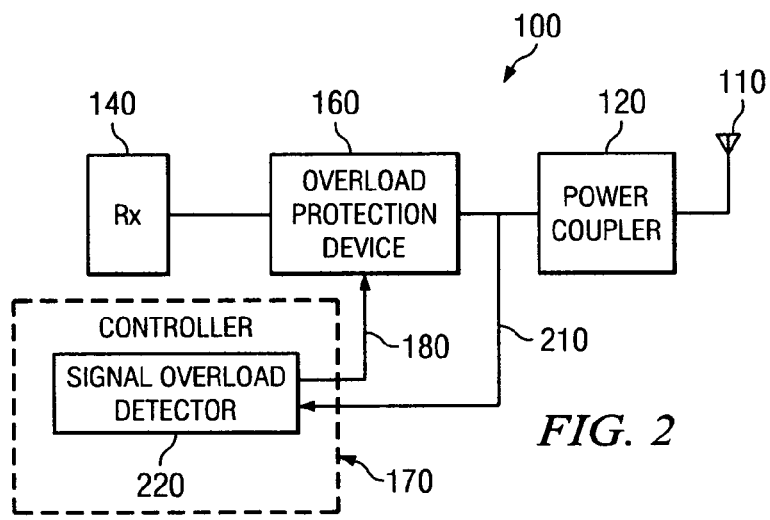
FIG. 2 is a block diagram of a portion of an exemplary testing device illustrating an exemplary controller for providing receiver overload protection, in accordance with embodiments of the present invention.

Turning now to FIG. 2, there is illustrated an exemplary overload controller 170 for controlling the overload protection device 160 of the testing device 100, in accordance with embodiments of the present invention. In FIG. 2, the overload controller 170 includes a signal overload detector 220 that is operable to detect overload conditions of the receiver 140. The signal overload detector 220 is connected to detect a received signal 210 provided by the power coupler 120 at the front end of the overload protection device 160 and to generate the control signal 180 to the overload protection device 160 as a function of the received signal 210.

More specifically, the signal overload detector 220 is operable to measure the signal strength (i.e., power) of the received signal 210. If the measured signal strength indicates that the receiver 140 is overloaded (e.g., the power of the received signal 210 is high corresponding to the transmit power level), the signal overload detector 220 generates the control signal 180 in a first state (e.g., logic "1") to cause the overload protection device 160 to reduce the signal strength of any signal present at the input of the overload protection device 160. If the measured signal strength indicates that the receiver 140 is not overloaded (e.g., the power of the received signal 210 is low corresponding to the receive power level), the signal overload detector 220 generates the control signal 180 in a second state (e.g., logic "0") to cause the overload protection device 160 to restore the signal strength of any signal present at the input of the overload protection device 160.

Figure 3:
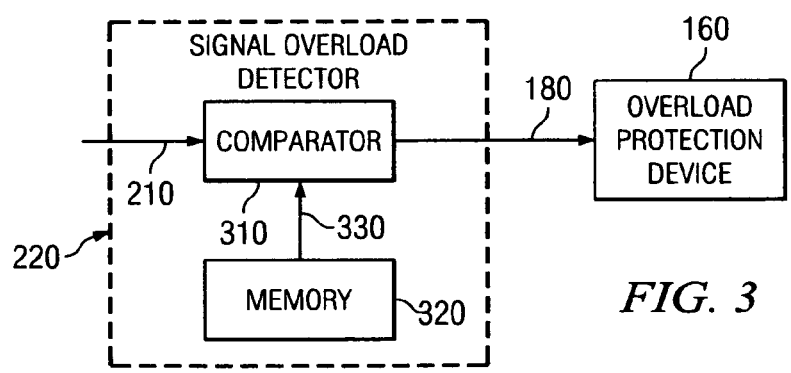
FIG. 3 is a more detailed block diagram of the controller of FIG. 2.

FIG. 3 is a more detailed block diagram of the signal overload detector 220 of FIG. 2. In FIG. 3, the signal overload detector 220 includes a comparator 310 and a memory 320 storing a predetermined threshold level 330. The predetermined threshold level 330 is set to differentiate between the transmit power level and the receive power level. Thus, the predetermined threshold level 330 defines a power level that corresponds to a transition between the transmit power level and receive power level. Power levels greater than the threshold level 330 indicate that the received signal is coupled from the transmitter of the testing device, while power levels less than the threshold level 330 indicate that the received signal is received by the antenna of the testing device.

In an exemplary operation, the comparator 310 takes as input both the received signal 210 present at the front end of the overload protection device 160 and the threshold level 330, performs a comparison between the signal level of the received signal 210 and the threshold level 330 and outputs the control signal 180 based on the results of the comparison. If the comparator 330 determines that the signal level of the received signal 210 is greater than the threshold level 330, the comparator 310 outputs the control signal 180 in a first state (e.g., logic "1") to cause the overload protection device 160 to reduce the signal strength of any signal present at the input of the overload protection device 160. If the comparator 330 determines that the signal level of the received signal 210 is less than the threshold level 330, the comparator 310 outputs the control signal 180 in a second state (e.g., logic "0") to cause the overload protection device 160 to restore the signal strength of any signal present at the input of the overload protection device 160.

Figure 4:
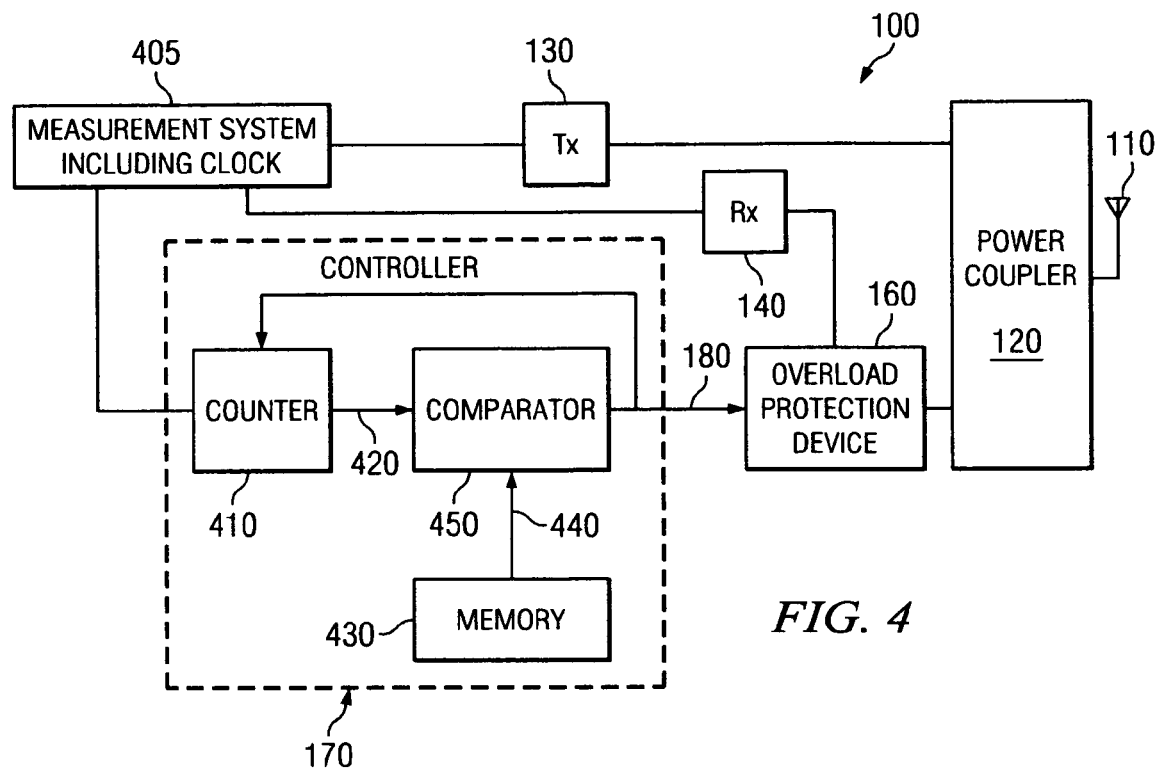
FIG. 4 is a block diagram of a portion of an exemplary testing device illustrating another exemplary controller for providing receiver overload protection, in accordance with embodiments of the present invention.

FIG. 4 is a block diagram of a portion of an exemplary testing device 100 illustrating another exemplary controller 170 for providing receiver overload protection, in accordance with embodiments of the present invention. In FIG. 4, the controller 170 includes a counter 410, a comparator 450 and a memory 430. The memory 430 stores timing information 440 indicating timeslot beginnings. In one embodiment, the timing information 440 includes timeslot lengths. In another embodiment, the timing information 440 includes one or more times at which new timeslots begin.

The counter 410, transmitter 130 and receiver 140 are all clocked by a clock signal generated by a measurement system including system clock 405. The clock signal controls the timing of transmit timeslots transmitted by transmitter 130 and receive timeslots received by receiver 140. The counter 410 is further operable to count pulses of the clock signal and produce a pulse count 420 to the comparator 450. Thus, the comparator 450 takes as input the pulse count 420 output by the counter 410 and the timing information 440 retrieved from the memory 430. The comparator 450 is operable to perform a comparison of the pulse count 420 to the timing information 440 and to output the control signal 180 based on the results of the comparison. In general, the comparator sets the state of the control signal 180 to cause the overload protection device 160 to reduce the signal strength of the received signal upon detection of a beginning of a transmit timeslot and sets the state of the control signal 180 to cause the overload protection device 160 to restore the signal strength of the received signal upon detection of a beginning of a receive timeslot.

For example, in one embodiment, the timing information 440 input to the comparator 450 includes a total number of clock pulses corresponding to a length of a current timeslot. The counter 410 is initialized at the beginning of the current timeslot, and produces a pulse count 420 indicative of the number clock pulses that have occurred since the beginning of the current timeslot. The comparator 450 compares the current number clock pulses in the pulse count 420 to the total number of clock pulses in the timing information 440. When the current number of clock pulses in the pulse count 420 equals the total number of clock pulses in the timing information 440, the comparator 450 switches the state of the control signal 180 to indicate that the current timeslot has ended and a new timeslot is beginning. In addition, when the pulse count 420 equals the timing information 450, the comparator 450 resets the counter 410 to begin counting clock pulses for the new timeslot. The timeslot length can be the same for each timeslot, different for transmit and receive timeslots or different for each timeslot. Regardless, the appropriate timeslot length for the current timeslot is input to the comparator 450.

As an example, if the current timeslot is a receive timeslot, when the pulse count 420 equals the timing information 450, indicating the end of the receive timeslot and the beginning of a new transmit timeslot, the comparator 450 outputs the control signal 180 in a first state (e.g., logic "1") to cause the overload protection device 160 to reduce the signal strength of any signal present at the input of the overload protection device 160. As another example, if the current timeslot is a transmit timeslot, when the pulse count 420 equals the timing information 450, indicating the end of the transmit timeslot and the beginning of a receive timeslot, the comparator 450 switches the state of the control signal 180 to a second state (e.g., logic "0") to cause the overload protection device 160 to restore the signal strength of any signal present at the input of the overload protection device 160.

In another embodiment, the counter 410 operates as a time accumulator, and the timing information 440 input to the comparator 450 includes a time at which a new timeslot immediately following the current timeslot should begin. The pulse count 420 produced by the counter 410 is indicative of the current system time in the testing device. The comparator 450 compares the current system time in the pulse count 420 to the time at which a new timeslot should begin in the timing information 440. When the current system time equals the beginning time for the new timeslot, the comparator 450 switches the state of the control signal 180 to indicate that the current timeslot has ended and a new timeslot is beginning.

Figure 5:
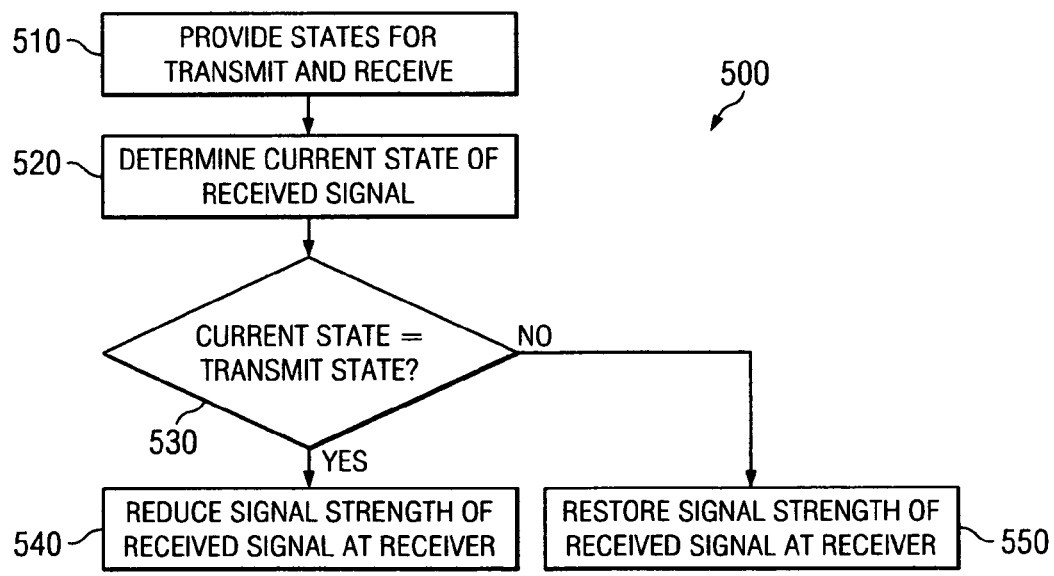
FIG. 5 is a flow chart illustrating an exemplary method for providing receiver overload protection during testing of a DUT, in accordance with embodiments of the present invention.

FIG. 5 is a flow chart illustrating an exemplary process 500 for providing receiver overload protection during testing of a transceiver, in accordance with embodiments of the present invention. Initially, at block 510, states for transmitting signals and receiving signals are loaded into a testing device that includes a transmitter and a receiver. For example, a transmit state corresponding to a first power level can be provided for transmitting signals by the testing device transmitter and a receive state corresponding to a second power level can be provided for receiving signals at the testing device receiver. At block 520, a current state of a signal present at the input of the testing device receiver is determined. In one embodiment, the current state of the received signal is determined from the received signal itself. In another embodiment, the current state of the received signal is determined from the current timeslot.

Thereafter, at block 530, a determination is made whether the current state corresponds to the transmit state. If the current state is the transmit state (Y branch of block 530), at block 540, the signal strength of the received signal is reduced at the testing device receiver to prevent overload of the testing device receiver. However, if the current state is the receive state (N branch of block 530), at block 550, the signal strength of the received signal is restored at the testing device receiver to enable the testing device receiver to receive and process the received signal.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. A testing device for testing a transceiver, said testing device comprising:
   a transmitter operable in a first state to transmit signals;
   a receiver operable in a second state to receive signals;
   a power coupler coupling said transmitter to said receiver;
   an overload protection device operably coupled between said power coupler and said receiver to reduce the signal strength of a received signal at said receiver based on a control signal; and
   a controller operable to determine a current state of said received signal and to generate said control signal based on said current state of said received signal, wherein said controller includes a comparator for comparing a signal level of said received signal to a threshold, and wherein said controller is operable to generate said control signal to reduce the signal strength of said received signal when said signal level is greater than said threshold and to generate said control signal to restore the signal strength of said received signal when said signal level is less than said threshold.

2. A testing device for testing a transceiver, said testing device comprising:

a transmitter operable in a first state to transmit signals;
a receiver operable in a second state to receive signals;
a power coupler coupling said transmitter to said receiver;
an overload protection device operably coupled between said power coupler and said receiver to reduce the signal strength of a received signal at said receiver based on a control signal;
a controller operable to determine a current state of said received signal and to generate said control signal based on said current state of said received signal; and
a memory for storing timing information indicating timeslot beginnings; and
wherein said controller is operable to generate said control signal to reduce the signal strength of said received signal upon detection of a beginning of a transmit timeslot using said timing information and to generate said control signal to restore the signal strength of said received signal upon detection of a beginning of a receive timeslot using said timing information.

3. The testing device of claim 2, wherein said controller is connected to receive a clock signal and is further operable to compare said timing information to said clock signal to detect said beginning of said transmit timeslot and said beginning of said receive timeslot.

4. The testing device of claim 3, wherein said controller further includes:
a counter operable to count pulses of said clock signal to produce a pulse count; and
a comparator operable to compare said pulse count to said timing information and to generate said control signal when said pulse count equals said timing information.

5. The testing device of claim 1, wherein said overload protection device includes an attenuator operable at a first attenuation setting to attenuate the signal strength of said received signal by a first amount and at a second attenuation setting to attenuate the signal strength of said received signal by a second amount greater than said first amount.

6. A method for providing receiver overload protection during transceiver testing, said method comprising:
providing a first state for transmitting signals and a second state for receiving signals;
determining a current state of a received signal; and
if said current state is said first state, reducing the signal strength of said received signal, if said current state is said second state, maintaining the signal strength of said received signal wherein said determining the current state of the received signal further comprises:
comparing a signal level of said received signal to a threshold;
determining said current state is said first state when said signal level is greater than said threshold; and
determining said current state is said second state when said signal level is less than said threshold.

7. A method for providing receiver overload protection during transceiver testing, said method comprising:
providing a first state for transmitting signals and a second state for receiving signals;
determining a current state of a received signal; and
if said current state is said first state, reducing the signal strength of said received signal, if said current state is said second state, maintaining the signal strength of said received signal, wherein said determining the current state of the received signal further comprises:
storing timing information indicating timeslot beginnings; and
determining said current state is said first state upon detection of a beginning of a transmit timeslot using said timing information; and
determining said current state is said second state upon detection of a beginning of a receive timeslot using said timing information.

8. The method of claim 7, wherein said determining said current state of said received signal further comprises:
using a system clock signal;
comparing said timing information to said clock signal to detect said beginning of said transmit timeslot and said beginning of said receive timeslot.

9. The method of claim 8, wherein said comparing said timing information to said clock signal further includes:
counting pulses of said clock signal to produce a pulse count;
comparing said pulse count to said timing information; and
generating said control signal when said pulse count equals said timing information.

* * * * *